US010810165B2

(12) United States Patent
Cha et al.

(10) Patent No.: US 10,810,165 B2
(45) Date of Patent: Oct. 20, 2020

(54) DISTRIBUTED STORAGE SERVER, SERVER DEVICE INCLUDED THEREIN, AND METHOD OF OPERATING SERVER DEVICE

(71) Applicant: Electronics and Telecommunications Research Institute, Daejeon (KR)

(72) Inventors: Myung Hoon Cha, Daejeon (KR); Sang-Min Lee, Daejeon (KR); Young Kyun Kim, Daejeon (KR); Hong Yeon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 383 days.

(21) Appl. No.: 15/586,083

(22) Filed: May 3, 2017

(65) Prior Publication Data

US 2018/0101543 A1 Apr. 12, 2018

(30) Foreign Application Priority Data

Oct. 7, 2016 (KR) .......................... 10-2016-0130107
Jan. 4, 2017 (KR) .......................... 10-2017-0001564

(51) Int. Cl.
| G06F 16/00 | (2019.01) |
| G06F 16/176 | (2019.01) |
| G06F 16/13 | (2019.01) |
| G06F 16/27 | (2019.01) |
| G06F 16/16 | (2019.01) |
| G06F 16/18 | (2019.01) |

(52) U.S. Cl.
CPC .......... *G06F 16/1774* (2019.01); *G06F 16/13* (2019.01); *G06F 16/164* (2019.01); *G06F 16/1865* (2019.01); *G06F 16/27* (2019.01)

(58) Field of Classification Search
CPC ........................... G06F 16/164; G06F 16/1774
See application file for complete search history.

(56) References Cited

U.S. PATENT DOCUMENTS

| 6,088,694 A | * | 7/2000 | Burns ................ G06F 11/1451 |
| 9,069,571 B2 | | 6/2015 | Fried et al. |
| 9,135,284 B1 | | 9/2015 | Vidwans et al. |
| 9,378,218 B2 | | 6/2016 | Kim et al. |
| 9,852,146 B1 | * | 12/2017 | Bent .................. G06F 16/1774 |
| 2012/0036161 A1 | * | 2/2012 | Lacapra ................ G06F 16/13 707/781 |
| 2015/0286657 A1 | | 10/2015 | Vaghani et al. |
| 2016/0274980 A1 | | 9/2016 | Kim et al. |

* cited by examiner

*Primary Examiner* — Grace Park

(57) ABSTRACT

A distributed storage server includes a plurality of data server devices and a plurality of metadata server devices. The metadata server devices store metadata associated with data which is distributively stored in the data server devices. A selected metadata server device checks whether a dangling directory occurs by performing a rename operation, based on information associated with a full path of a parent directory of a source and a full path of a parent directory of a target included in a request of the rename operation. When it is determined that the dangling directory does not occur, the selected metadata server device processes transactions directed to the metadata such that the rename operation is performed. The checking whether the dangling directory occurs is performed before a transaction period for processing the transactions.

15 Claims, 12 Drawing Sheets

FIG. 11

Q5'
rename(Root/D4, D5, Root/D4/D5/D6, D5)
        _____/  _____/
          First          Second
         full path       full path

FIG. 12

| | Step 1 | Step 2 | Step 3 | Step 4 |
|---|---|---|---|---|
| Reference Directory | Root | D4 | D5 | D6 |
| Partial Path | Root | Root/D4 | Root/D4/D5 | Root/D4/D5/D6 |
| Check | Being different from first full path | Being identical to first full path → Determining that dangling directory occurs | | |

FIG. 13

Q7' rename(Root/D1/D2, D3, Root/D4/D5/D6, D3)
       _____/       _____/
          First              Second
        full path          full path

FIG. 14

| | Step 1 | Step 2 | Step 3 |
|---|---|---|---|
| Object Directory | Root/D4 | D4/D5 | D5/D6 |
| Check | D4 actually exists at lower level of Root | D5 does not actually exist at lower level of D4 → Rejection Response | |

FIG. 15

Q3'
rename(Root/D1, f2, Root/D1/D2, f4) ⟹ Lock Sequence : D1 → D2

Q4
hardlink(D2, f4, D1, f5)           ⟹ Lock Sequence : D1 → D2

DISTRIBUTED STORAGE SERVER, SERVER DEVICE INCLUDED THEREIN, AND METHOD OF OPERATING SERVER DEVICE

CROSS-REFERENCE TO RELATED APPLICATIONS

This U.S. non-provisional patent application claims priority under 35 U.S.C. § 119 to Korean Patent Application Nos. 10-2016-0130107, filed on Oct. 7, 2016, and 10-2017-0001564, filed on Jan. 4, 2017, in Korean Intellectual Property Office, the entire contents of which are incorporated herein by reference.

TECHNICAL FIELD

The present disclosure relates to a distributed computing system, and more particularly, relates to a scheme of performing an operation in a distributed storage server.

DESCRIPTION OF THE RELATED ART

Recently, as an amount of information/data increases rapidly, it becomes insufficient to store a large amount of data in a single storage server. To store a large amount of data and efficiently manage the stored data, a distributed storage server using a plurality of storage servers has been proposed. The distributed storage server drives a distributed file system to manage data which is distributively stored in the plurality of storage servers. To manage the distributively stored data, the plurality of storage servers is connected to one another through a network.

Among the plurality of storage servers, some servers distributively store data. Some other servers store metadata associated with the distributively stored data. The metadata indicates which data is stored and which server stores the data. Some other servers store information of a namespace for the distributively stored data. The distributed file system systemizes data, metadata and namespace information by a unit of directory, to manage data stored in the distributed storage server.

The distributed storage server stores/reads/modifies/deletes data, in response to a request from a client. To process the request from the client, the distributed storage server drives the distributed system to perform various operations on the distributively stored data. For example, the distributed storage server performs a rename operation to modify an attribute (e.g., a name, a location, a structure, and/or the like) of a directory and/or a file.

A complex operation, such as the rename operation, accompanying a plurality of parameters requires accesses to several directories and/or files simultaneously or concurrently. However, files and/or directories on which the operation is to be performed may be distributed to different servers. Accordingly, to process a complex operation such as the rename operation, it may be required to perform communication with several servers.

SUMMARY

Example embodiments of the present invention may provide a scheme of performing an operation in a distributed storage server. The example embodiments may provide a scheme of preventing collision (e.g. deadlock, namespace inconsistency, and/or the like) that may occur between servers when a rename operation is processed while communication is performed with several servers.

Some example embodiments may provide a distributed storage server which may include a plurality of data server devices and a plurality of metadata server devices. The data server devices may distributively store data. The metadata server devices may distributively store metadata which is associated with the distributively stored data. A metadata server device selected from among the metadata server devices may check whether a dangling directory occurs by performing a rename operation, based on information associated with a full path of a parent directory of a source and a full path of a parent directory of a target included in a request of the rename operation received from a client device. The selected metadata server device may process transactions directed to the distributively stored metadata such that the rename operation is performed, when it is determined that the dangling directory does not occur. The checking whether the dangling directory occurs may be performed before a transaction period which is for processing the transactions.

In some example embodiments, the selected metadata server device may exclusively process the request of the rename operation, and remaining metadata server devices other than the selected metadata server device may not process the request of the rename operation.

In some example embodiments, the selected metadata server device may store metadata associated with a root directory of a namespace for the distributively stored data.

In some example embodiments, the metadata server devices may include a first metadata server device associated with the source and a second metadata server device associated with the target. When it is determined that the dangling directory does not occur, the selected metadata server device may output, for the client device, a response directed to the first and second metadata server devices as a result of processing the transactions. Then, the first and second metadata server devices may be accessed by the client device, based on the output response, such that the rename operation is performed.

In some example embodiments, when it is determined that the dangling directory occurs, the selected metadata server device may output, for the client device, a response indicating a rejection of the rename operation.

Some example embodiments may provide a server device which may include a storage, an operation manager, and a transaction processor. The storage may store metadata associated with data which is distributively stored in a distributed storage server. The operation manager may check, in response to a request of a rename operation, whether a dangling directory occurs by performing the rename operation. When it is determined that the dangling directory does not occur, the transaction processor may process transactions directed to at least the metadata such that the rename operation is performed. The checking whether the dangling directory occurs may be performed before a transaction period which is for processing the transactions.

In some example embodiments, the request of the rename operation may include information associated with a first full path of a parent directory of a source of the rename operation, and may include information associated with a second full path of a parent directory of a target of the rename operation.

In some example embodiments, the first full path may include a full path from a root directory to the parent directory of the source, and the second full path may include a full path from the root directory to the parent directory of the target. The operation manager may check whether the second full path includes the first full path, to check whether the dangling directory occurs.

In some example embodiments, the operation manager may check whether a partial path included in the second full path is identical to the first full path, to check whether the second full path includes the first full path. The partial path may correspond to a directory path from the root directory to a reference directory, and the reference directory may be changed downward by each one level of directory on the second full path from the root directory to the parent directory of the target.

In some example embodiments, the second full path may include a first directory and a second directory which is a child of the first directory. The operation manager may check whether the second directory actually exists at a lower level of the first directory, while checking whether the dangling directory occurs.

In some example embodiments, the operation manager may communicate with other server device which stores metadata associated with the first and second directories, to check whether the second directory actually exists at the lower level of the first directory.

In some example embodiments, the operation manager may set a rename-exclusive lock in response to the request of the rename operation. The operation manager may release the rename-exclusive lock in response to completion of processing the transactions.

In some example embodiments, the operation manager may postpone processing other rename operations other than the rename operation, in response to setting the rename-exclusive lock.

Some example embodiments may provide a method of operating a server device. The method may include receiving, through a communication device of the server device, a first request of a rename operation; setting, by a processor of the server device, a rename-exclusive lock in response to the first request; after setting the rename-exclusive lock, checking, by the processor, whether a dangling directory occurs by performing the rename operation, based on information included in the first request; obtaining, by the processor, first locks associated with a source and a target of the rename operation, when it is determined that the dangling directory does not occur; and after obtaining the first locks, processing, by the processor, transactions directed to metadata which is stored in the server device, such that the rename operation is performed for the source and the target.

In some example embodiments, the method may further include receiving, through the communication device, a second request of an operation having a different type from the rename operation; and obtaining, by the processor, second locks associated with the operation having the different type.

In some example embodiments, in obtaining the first and second locks, a lock for a parent level of directory may be obtained before a lock for a child level of directory is obtained.

In some example embodiments, in obtaining the first and second locks, a lock for a first directory may be obtained before a lock for a second directory which is created later than the first directory is obtained.

In some example embodiments, the method may further include receiving, through the communication device, a third request of a rename operation; releasing, by the processor, the rename-exclusive lock in response to completion of processing the transactions; and after releasing the rename-exclusive lock, performing, by the processor, an operation associated with the third request.

In some example embodiments, the method may further include releasing, by the processor, the rename-exclusive lock in response to completion of processing the transactions; and outputting, through the communication device, a result of processing the transactions.

The example embodiments may prevent collision which may occur between servers when a rename operation is processed while communication is performed with several servers. Accordingly, it may be possible to prevent a case where a transaction process is blocked or pending, and to maintain namespace consistency. As a result, stability and reliability of the distributed computing system, the distributed storage server, and the server device may be improved.

BRIEF DESCRIPTION OF THE DRAWINGS

The above and other features and advantages will become apparent from the following description with reference to the following figures, wherein like reference numerals refer to like parts throughout the various figures unless otherwise specified, and wherein:

FIGS. 11 to 14 are conceptual diagrams for describing example methods of preventing a dangling directory from occurring in the selected metadata server device of FIG. 8; and FIG. 15 is a conceptual diagram for describing an example method of obtaining a lock for an operation parameter in the selected metadata server device of FIG. 8.

DETAILED DESCRIPTION OF EMBODIMENTS

All the above-mentioned features and the following descriptions are provided to facilitate better understanding of the present disclosure. The present invention should not be construed as limited to the "example" embodiments set forth herein, and may be embodied in different forms. The following embodiments are merely examples for fully disclosing the present invention, and are described to provide the inventive concepts to those skilled in the art to which the present invention belongs. Therefore, if there are several ways to implement the present invention, it will be understood that the present invention may be implemented with any one of the ways or any one of the similar/equivalent things thereof.

If it is mentioned that any configuration includes/comprises specific component(s) or any process includes/comprises specific operation(s) in the present disclosure, this means that other component(s) or other operation(s) may be further included. That is, the terms used herein are only intended to describe the specific example embodiments, and are not intended to limit the scope of the present disclosure. Further, the examples described that are provided to facilitate better understanding of the present disclosure include their complementary embodiments.

The terms used herein have the meanings in which those skilled in the art would generally understand. The terms commonly used are to be construed as the consistent meanings in the context of the present disclosure. In addition, the terms used herein should not be interpreted in an overly ideal or formal sense unless explicitly so defined herein. Hereinafter, some example embodiments of the present invention will be described below with reference to the attached drawings.

Figure 1:
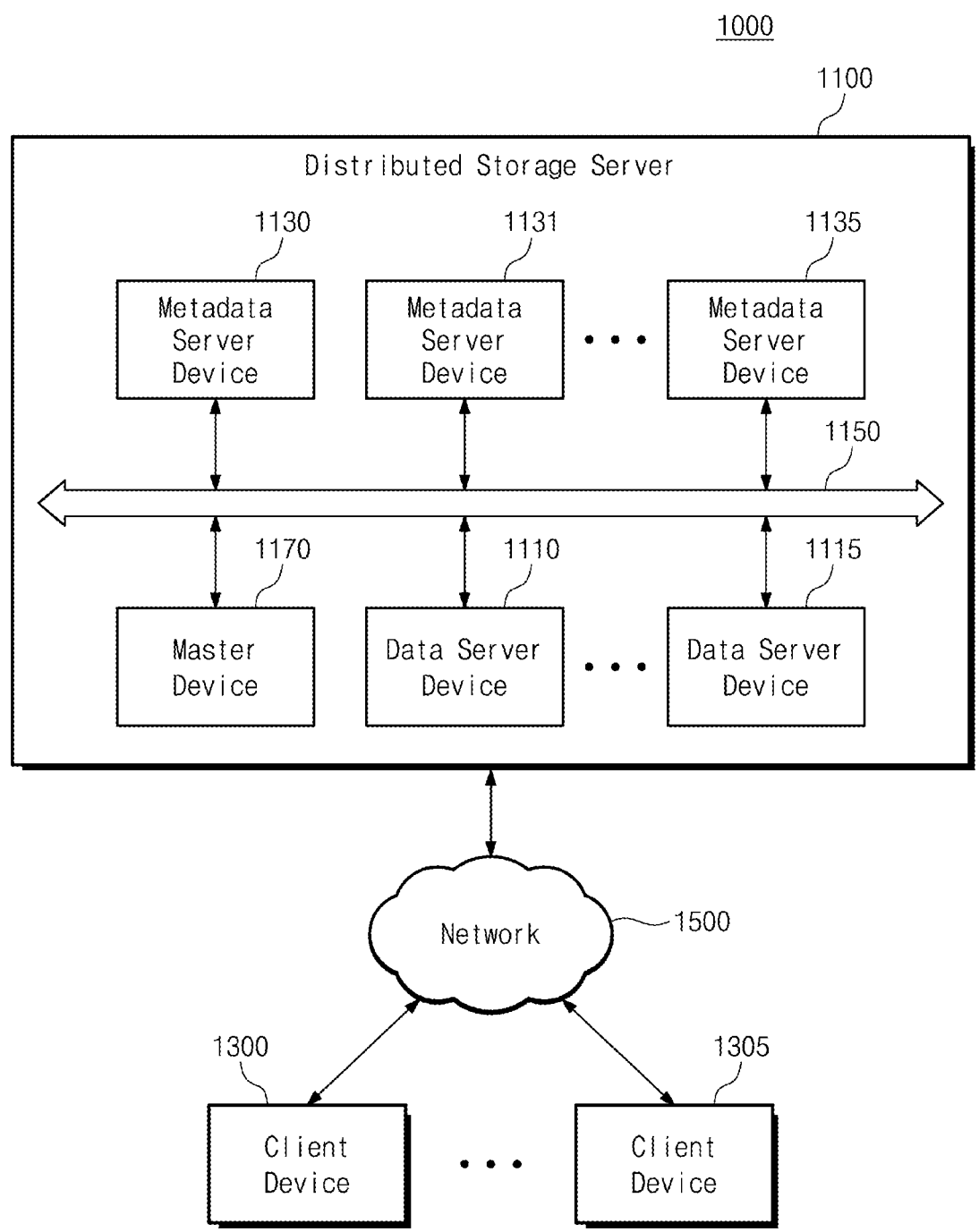
FIG. 1 is a block diagram illustrating a distributed computing system which includes a distributed storage server according to some example embodiments.

FIG. 1 is a block diagram illustrating a distributed computing system which includes a distributed storage server according to some example embodiments. In some example embodiments, a distributed computing system 1000 may include a distributed storage server 1100, client devices 1300 and 1305, and a network 1500. In some example embodiments, the distributed storage server 1100 may include a plurality of data server device 1110 and 1115, a plurality of metadata server devices 1130, 1131 and 1135, and a network 1150.

The distributed storage server 1100 may employ the data server devices 1110 and 1115 to store a large amount of data and to efficiently manage the stored data. The data server devices 1110 and 1115 may store data distributively (i.e., in a distributed manner) for the client devices 1300 and 1305. Accordingly, the distributed storage server 1100 may provide a storage service for the client devices 1300 and 1305.

Distributively storing data may be variously implemented. For example, data may be divided into a plurality of pieces, and the divided pieces may be distributively stored in all or some of the data server devices 1110 and 1115. For another example, a plurality of copies may be generated identically to the data, and the generated copies may be stored in all or some of the data server devices 1110 and 1115. However, these examples are provided to facilitate better understanding, and are not intended to limit the present disclosure.

The metadata server devices 1130, 1131 and 1135 may distributively store metadata. The metadata may include information associated with the distributively stored data. For example, the metadata may indicate which data is stored in a specific data server device, which data is associated with other data, and/or the like.

The distributed storage server 1100 may drive a distributed file system to manage the distributively stored data. The distributed file system may systemize data, metadata and namespace information by a unit of directory, to manage the distributively stored data. To manage the distributively stored data, the data server devices 1110 and 1115 and the metadata server devices 1130, 1131, and 1135 may communicate with one another through the network 1150.

The distributed storage server 1100 may receive a request from each of the client devices 1300 and 1305. The distributed storage server 1100 may store/read/modify/delete data, in response to the request. To process the data in response to the request, the distributed storage server 1100 may drive the distributed file system to perform various operations on the distributively stored data. Each of the client devices 1300 and 1305 may communicate with the distributed storage server 1100 through the network 1150.

For example, the client device 1300 may intend to read the data stored in the distributed storage server 1100. The client device 1300 may provide a request for reading the data to the distributed storage server 1100 through the network 1500. The distributed storage server 1100 may determine which data server device stores the read-requested data, with reference to the metadata stored in the metadata server devices 1130, 1131, and 1135. The distributed storage server 1100 may read the data from the determined data server device. The distributed storage server 1100 may provide the read data to the client device 1300 through the network 1500.

As illustrated in FIG. 1, the network 1150 may be separately provided from the network 1500. However, in some example embodiments, the network 1150 may share a communication channel with the network 1500. For example, each of the network 1150 and the network 1500 may include a wired network employing transmission control protocol/Internet protocol (TCP/IP), and/or a wireless network employing long term evolution (LTE), code division multiple access (CDMA), wireless fidelity (Wi-Fi), and/or the like, but the present disclosure is not limited thereto.

The numbers of data server devices and metadata server devices included in the distributed storage server 1100 may be variously modified or changed. Furthermore, a topology of the distributed computing system 1000 may be modified or changed differently from that illustrated in FIG. 1. For example, configurations of the distributed computing system 1000 and the distributed storage server 1100 may be modified or changed depending on various factors such as a size, performance, purpose, and/or the like, of the distributed storage server 1100.

In some example embodiments, the distributed storage server 1100 may further include a master device 1170. The master device 1170 may manage overall operations of the distributed storage server 1100. For example, the master device 1170 may control communication paths between the data server devices 1110 and 1115 and the metadata server devices 1130, 1131 and 1135. For example, the master device 1170 may schedule operations of the data server devices 1110 and 1115 and the metadata server devices 1130, 1131 and 1135. However, in some example embodiments, the metadata server devices 1130, 1131 and 1135 may perform functions of the master device 1170, without the master device 1170.

The data server devices 1110 and 1115, the metadata server devices 1130, 1131 and 1135, the master device 1170, and the client devices 1300 and 1305 may include various types of electronic devices. For example, each of the data server devices 1110 and 1115, the metadata server devices 1130, 1131 and 1135, the master device 1170, and the client devices 1300 and 1305 may be implemented in an electronic device which is capable of processing data by means of one or more processor cores and one or more memories.

For example, each of the data server devices 1110 and 1115, the metadata server devices 1130, 1131 and 1135, the master device 1170, and the client devices 1300 and 1305 may include one of electronic devices such as a desktop computer, a laptop computer, a tablet computer, a smart phone, a wearable device, a workstation, a blade server, a micro-server, and/or the like. However, the above examples are provided to facilitate better understanding, and are not intended to limit the present disclosure.

Figure 2:
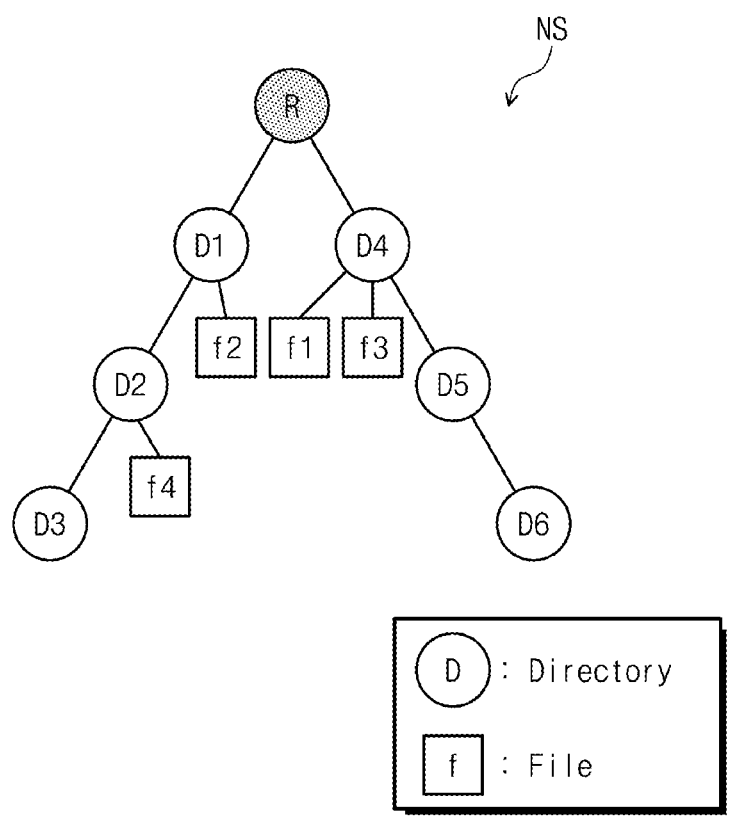
FIG. 2 is a conceptual diagram illustrating an example namespace which is managed in the distributed storage server of FIG. 1.

FIG. 2 is a conceptual diagram illustrating an example namespace which is managed in the distributed storage server of FIG. 1. To facilitate better understanding, FIG. 1 will be referred to together with FIG. 2.

For example, the distributed storage server 1100 may systemize data by a unit of directory, to manage the data. An example namespace NS of FIG. 2 may describe a systemized structure of the data which is distributively stored in the distributed storage server 1100. For example, the distributed storage server 1100 may manage data with structures of directory and file, and the namespace NS may describe the structures of directory and file.

For example, there may be a root directory R at the uppermost level of the namespace NS, and there may be directories D1 and D4 at a lower level of the root directory R. There may be directories D2 and D3 at a lower level of the directory D1, and there may be directories D5 and D6 at a lower level of the directory D4.

Among directories which are neighboring up and down, an upper level of directory may be referred to as a parent directory, and a lower level of directory may be referred to as a child directory. For example, the directory D4 is adjacent to the directory D5, and thus the directory D4 may be a parent directory of the directory D5. Similarly, the directory D2 is adjacent to the directory D1, and thus the directory D2 may be a child directory of the directory D1.

For example, files f1 and f3 may be stored in the directory D4. For example, a file f2 may be stored in the directory D1, and a file f4 may be stored in the directory D2.

The namespace NS of FIG. 2 is just an example, and is not intended to limit the present disclosure. Data which is distributively stored in the distributed storage server 1100 may be managed with a namespace having a different structure from that illustrated in FIG. 2. However, hereinafter for better understanding, examples based on the structure of the namespace NS of FIG. 2 will be described.

Figure 3:
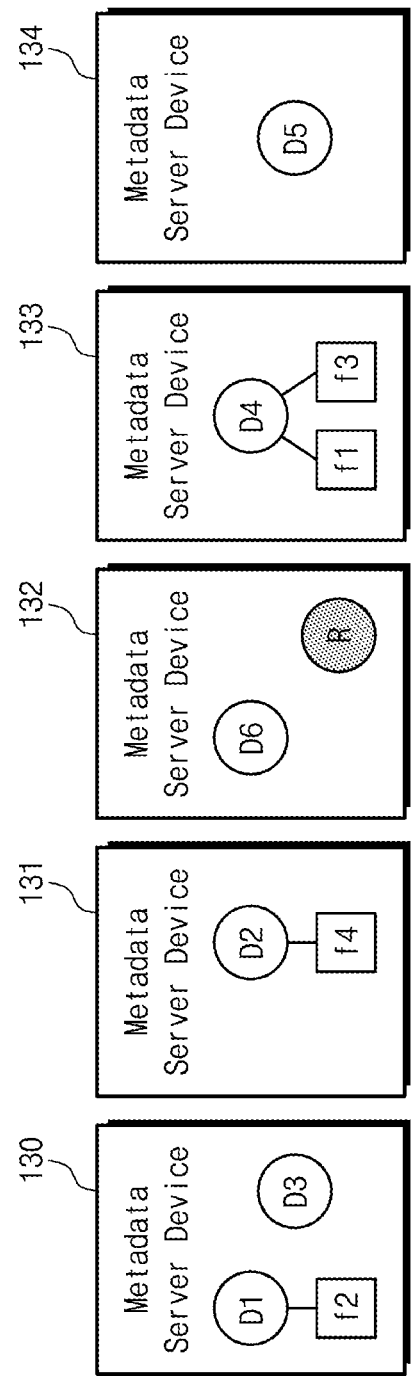
FIG. 3 is a conceptual diagram illustrating example metadata which is distributively stored in the distributed storage server of FIG. 1.

FIG. 3 is a conceptual diagram illustrating example metadata which is distributively stored in the distributed storage server of FIG. 1. To facilitate better understanding, FIG. 1 will be referred to together with FIG. 3.

For example, the distributed storage server 1100 may include metadata server devices 130, 131, 132, 133 and 134. The metadata server devices 130, 131, 132, 133 and 134 may correspond to the metadata server devices 1130, 1131 and 1135. As described with reference to FIG. 1, the metadata server devices 130, 131, 132, 133 and 134 may distributively store metadata.

For example, the metadata server device 130 may store metadata associated with the directories D1 and D3 and the file f2, and the metadata server device 131 may store metadata associated with the directory D2 and the file f2. The metadata server device 132 may store metadata associated with a root directory R and the directory D6. The metadata server device 133 may store metadata associated with the directory D4 and the files f1 and f3, and the metadata server device 134 may store metadata associated with the directory D5.

The metadata distribution of FIG. 3 is just an example, and is not intended to limit the present disclosure. The metadata may be distributed differently from that illustrated in FIG. 3. However, hereinafter for better understanding, examples based on the metadata distribution of FIG. 3 will be described.

The distributed storage server 1100 may perform various operations to process data in response to requests from the client devices 1300 and 1305. For example, the distributed storage server 1100 may perform a rename operation to modify an attribute (e.g., a name, a location, a structure, and/or the like) of a directory and/or a file. For example, the client device 1300 may provide a request of the rename operation to the distributed storage server 1100, to change an attribute of a directory of data stored in the distributed storage server 1100.

For example, to facilitate better understanding in the present disclosure, the request of the rename operation may be notated with a form of "rename(P1, P2, P3, P4)". In this notation, "P2" may denote a source of the rename operation, and "P4" may denote a target of the rename operation. The source may mean an existing directory or file which is to be modified by the rename operation, and the target may mean a directory or file after being modified by the rename operation. In the above notation, "P1" may denote a parent directory of the source of the rename operation, and "P3" may denote a parent directory of the target of the rename operation.

The rename operation accompanies a plurality of parameters (e.g., P1, P2, P3 and P4), and thus the rename operation may require accesses to several directories and/or files simultaneously or concurrently. However, metadata which is to be referenced to perform the rename operation may be distributed to different metadata server devices. Accordingly, to perform the rename operation, it may be required to communicate with several metadata server devices.

For example, the client device 1300 may request to change the directory D3 at a lower level of the directory D2 to the directory D3 at a lower level of the directory D5. In this example, the client device 1300 may provide a request of the rename operation, e.g., "rename(D2, D3, D5, D3)", to the distributed storage server 1100.

The request of the rename operation "rename(D2, D3, D5, D3)" may require a process of generating an entry for the directory D3 in a data server device storing the directory D5, a process of associating the entry for the directory D3 with the directory D5, and a process of deleting an entry for the directory D3 from a data server device storing the directory D2. Meanwhile, metadata which is referenced to access the directories D2, D3 and D5 may be distributively stored in the metadata server devices 130, 131 and 134. Accordingly, to process transactions of such a rename operation, it may be required to perform communications with the metadata server devices 130, 131 and 134.

When metadata of directories and/or files are distributed to several metadata server devices, the rename operation may require communications with several metadata server devices. It may be hardly possible to process the rename operation with a local transaction, and most of the rename operations may be processed with distributed transactions.

However, communicating with several metadata server devices may cause collision. For example, deadlock may occur in some transactions, and/or a transaction process may be blocked or pending. For example, some transactions may cause namespace inconsistency. Such collisions may deteriorate stability and reliability of the distributed storage server 1100. Collision which may occur in the distributed storage server 1100 will be described with reference to FIGS. 4 to 7.

Figure 4:
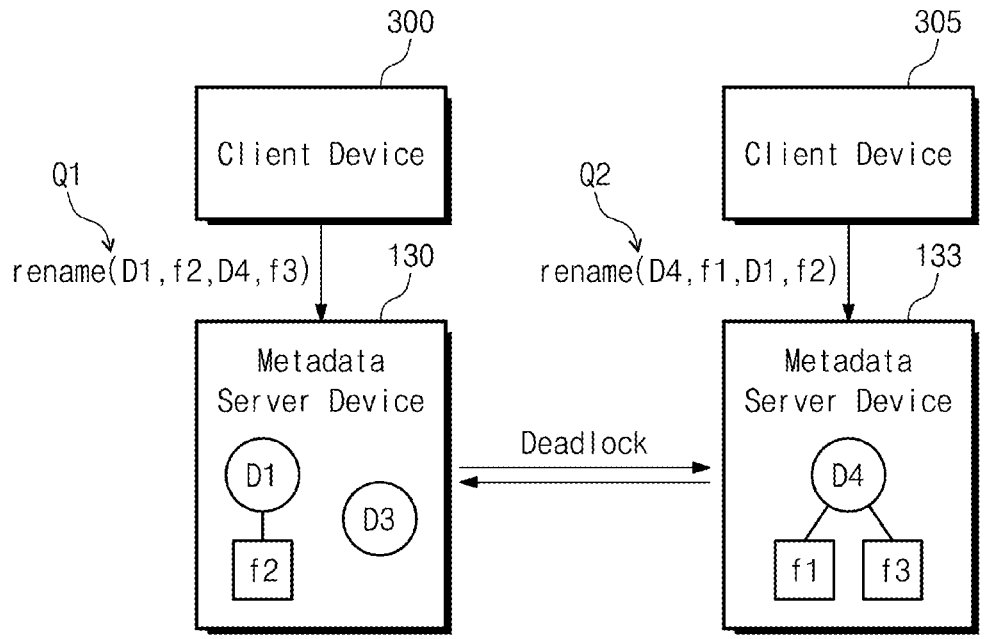
FIGS. 4 and 5 are conceptual diagrams for describing deadlock which may occur in the distributed storage server.

FIG. 4 is a conceptual diagram for describing deadlock which may occur in the distributed storage server. Client devices 300 and 305 may correspond to the client devices 1300 and 1305.

For example, the client device 300 may intend to modify the file f2 stored in the directory D1 to the file f3 stored in the directory D4. To this end, the client device 300 may provide a request Q1 of a rename operation to the distributed storage server 1100 of FIG. 1. At the same time, the client device 305 may intend to modify the file f1 stored in the directory D4 to the file f2 stored in the directory D1. To this end, the client device 305 may provide a request Q2 of a rename operation to the distributed storage server 1100.

For example, the metadata server device 130 may obtain a lock for the parent directory D1 of the source file f2 of the request Q1, to process the request Q1. The lock may be related to an access authority. A locked directory or a locked file may be accessed only by an entity which has an access authority, and an entity which does not have the access authority may not access the locked directory or the locked file. For example, the metadata server device 133 may obtain a lock for the parent directory D4 of the source file f1 of the request Q2, to process the request Q2.

Meanwhile, the metadata server device 130 may try to obtain a lock for the parent directory D4 of the target file f3 of the request Q1, to process the request Q1. However, the lock for the directory D4 has already been obtained by the metadata server device 133, and thus the metadata server device 130 may wait until the lock for the directory D4 is released.

In addition, the metadata server device 133 may try to obtain a lock for the parent directory D1 of the target file f2 of the request Q2, to process the request Q2. However, the lock for the directory D1 has already been obtained by the metadata server device 130, and thus the metadata server device 133 may wait until the lock for the directory D1 is released.

In the example of FIG. 4, each of the metadata server devices 130 and 133 waits a lock release of an opponent, and thus deadlock may occur. Accordingly, processing the requests Q1 and Q2 of the rename operation may be blocked. As described with reference to FIG. 4, multiple requests of the rename operation, which are requested at the same time, may cause deadlock.

Figure 5:
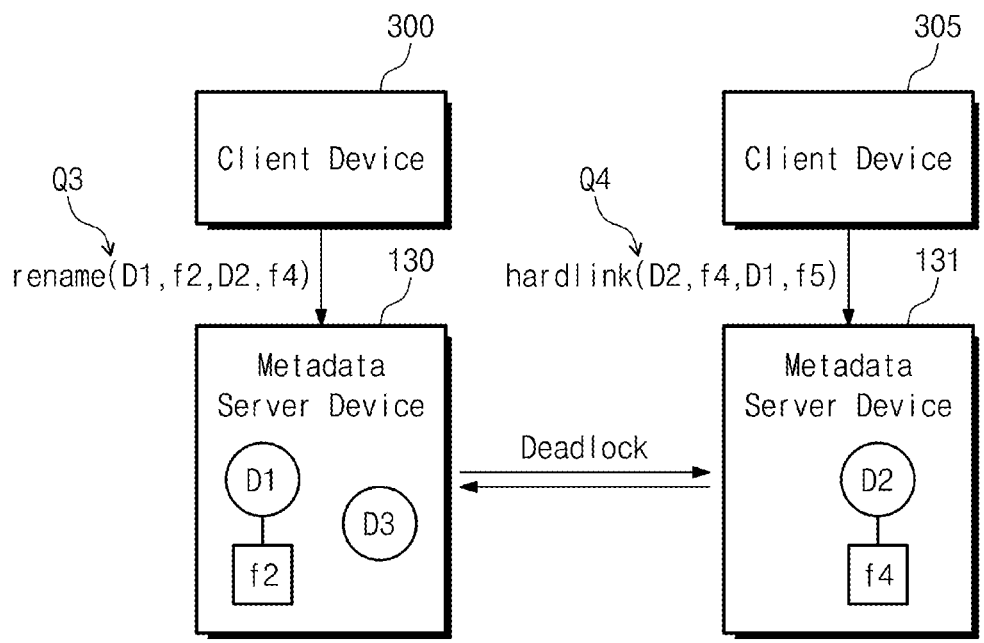

FIG. 5 is a conceptual diagram for describing deadlock which may occur in the distributed storage server.

For example, the client device 300 may intend to modify the file f2 stored in the directory D1 to the file f4 stored in the directory D2. To this end, the client device 300 may provide a request Q3 of the rename operation to the distributed storage server 1100 of FIG. 1. At the same time, the client device 305 may intend to link the file f4 stored in the directory D2 to a file f5 of the directory D1. To this end, the client device 305 may provide a request Q4 of a hardlink operation to the distributed storage server 1100.

For example, the metadata server device 130 may obtain a lock for the parent directory D1 of the source file f2 of the request Q3, to process the request Q3. For example, the metadata server device 131 may obtain a lock for the source file f4 of the request Q4, to process the request Q4.

Meanwhile, the metadata server device 130 may try to obtain a lock for the target file f4 of the request Q3, to process the request Q3. However, the lock for the file f4 has already been obtained by the metadata server device 131, and thus the metadata server device 130 may wait until the lock for the file f4 is released.

In addition, the metadata server device 131 may try to obtain a lock for the parent directory D1 of the target file f5 of the request Q4, to process the request Q4. However, the lock for the directory D1 has already been obtained by the metadata server device 130, and thus the metadata server device 131 may wait until the lock for the directory D1 is released.

In the example of FIG. 5, each of the metadata server devices 130 and 131 waits a lock release of an opponent, and thus deadlock may occur. Accordingly, processing the request Q3 of the rename operation and the request Q4 of the hardlink operation may be blocked. As described with reference to FIG. 5, multiple requests of different types of operations may also cause deadlock.

FIGS. 4 and 5 illustrate some example cases in which deadlock may occur. In some example embodiments, to avoid such deadlock, locks for directories and/or files of operation parameters may be identically obtained according to a specific sequence over all the metadata server devices. Such example embodiments will be described with reference to FIG. 15.

Figure 6:
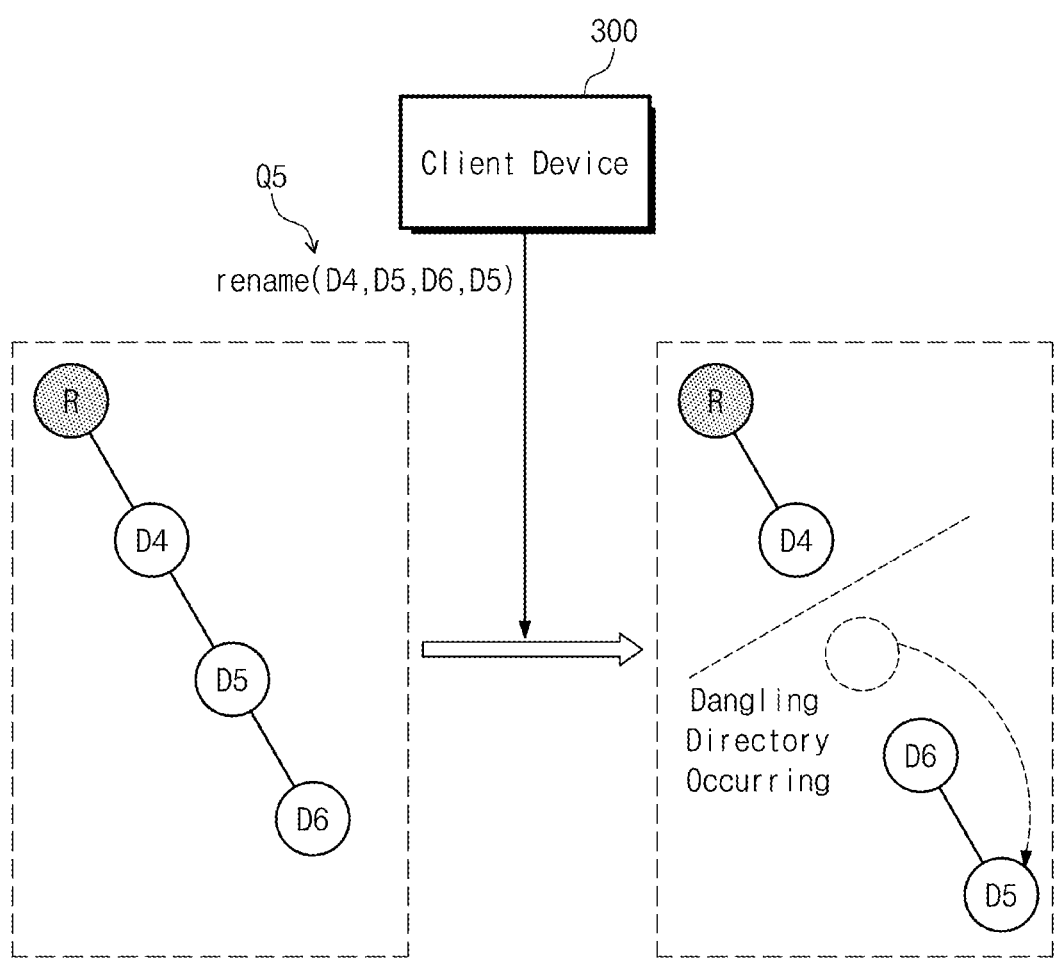
FIGS. 6 and 7 are conceptual diagrams for describing a dangling directory which may occur in the distributed storage server.

FIG. 6 is a conceptual diagram for describing a dangling directory which may occur in the distribution storage server.

For example, the client device 300 may intend to modify the directory D5 at a lower level of the directory D4 to the directory D5 at a lower level of the directory D6. To this end, the client device 300 may provide a request Q5 of the rename operation to the distributed storage server 1100 of FIG. 1.

However, the request Q5 may damage connectivity between the directories D4 and D6. Referring to FIG. 6, as the source directory D5 moves to a lower level of the parent directory D6 of the target, a directory path may be disconnected. Accordingly, a dangling directory where a directory path is disconnected may occur, and namespace consistency may be damaged.

Figure 7:
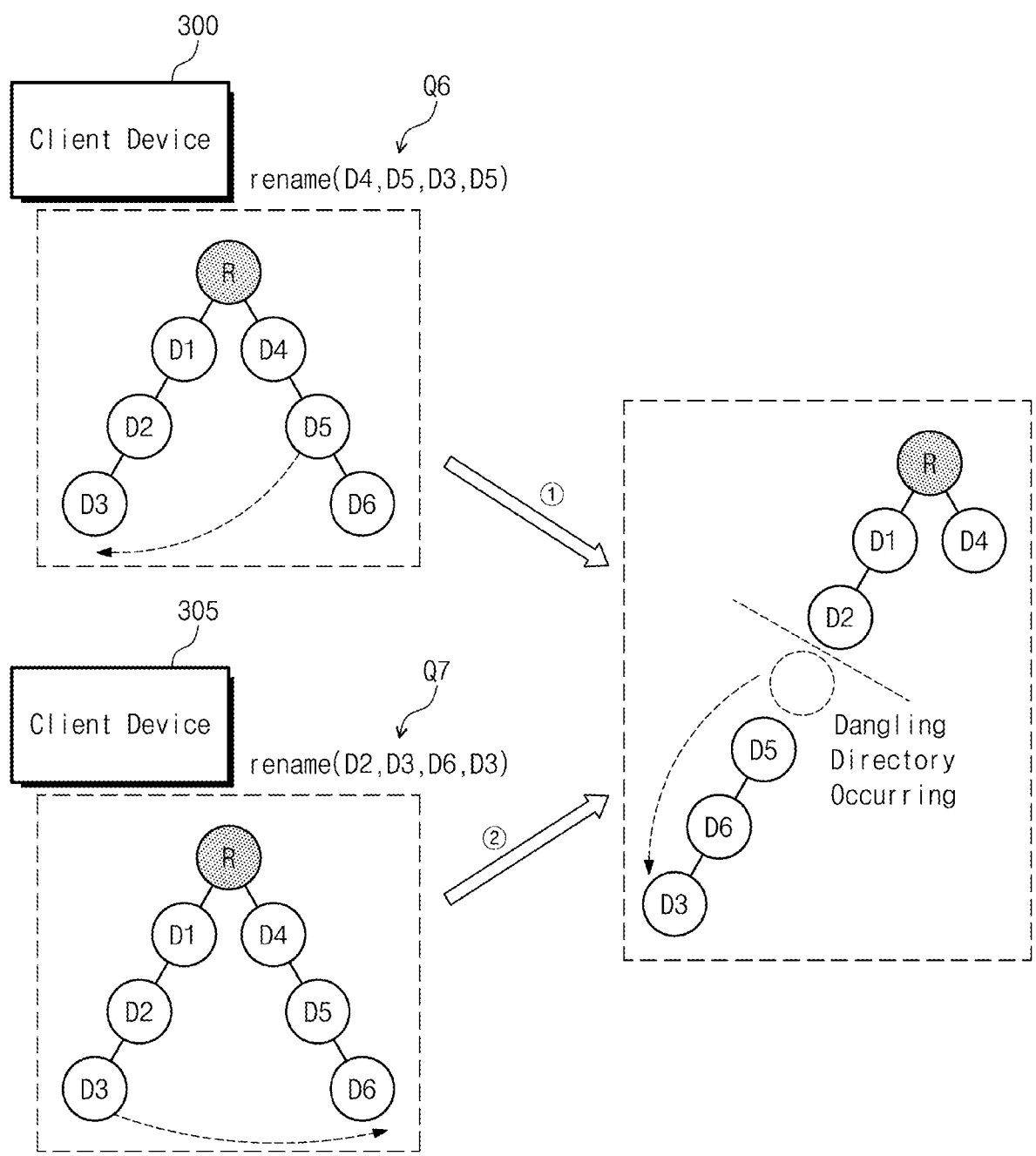

FIG. 7 is a conceptual diagram for describing a dangling directory which may occur in the distributed storage server.

For example, the client device 300 may intend to modify the directory D5 at a lower level of the directory D4 to the directory D5 at a lower level of the directory D3. To this end, the client device 300 may provide a request Q6 of the rename operation to the distributed storage server 1100 of FIG. 1.

For example, the client device 305 may intend to modify the directory D3 at a lower level of the directory D2 to the directory D3 at a lower level of the directory D6. To this end, the client device 305 may provide a request Q7 of the rename operation to the distributed storage server 1100.

Referring to FIG. 7, each of the requests Q6 and Q7 may not cause a dangling directory. However, when the requests Q6 and Q7 are simultaneously or successively processed, a dangling directory may occur. For example, when the source directory D5 moves to a lower level of the parent directory D3 of the target by the request Q6 and then the source directory D3 moves to a lower level of the parent directory D6 of the target by the request Q7, a directory path may be disconnected.

FIGS. 6 and 7 illustrate some example cases in which a dangling directory may occur. Checking whether a dangling directory occurs may prevent a dangling directory from occurring. However, metadata associated with directories and/or files of parameters of the rename operation may be distributively stored in several metadata server devices. Accordingly, accessing several metadata server devices to check a dangling directory may also cause collision.

In addition, even though an individual rename operation does not cause a dangling directory to occur, a dangling directory may occur by multiple rename operations in some operation conditions. Accordingly, checking a dangling directory may not prevent all of cases where a dangling directory occurs.

In some example embodiments, to prevent a dangling directory from occurring, an operation of checking whether a dangling directory occurs may be performed. In some example embodiments, checking whether a dangling directory occurs may be based on a full path of a parent directory of a source/target, and may be performed in advance before a transaction period which is for processing transactions. Such example embodiments will be described with reference to FIGS. 11 to 14.

Figure 8:
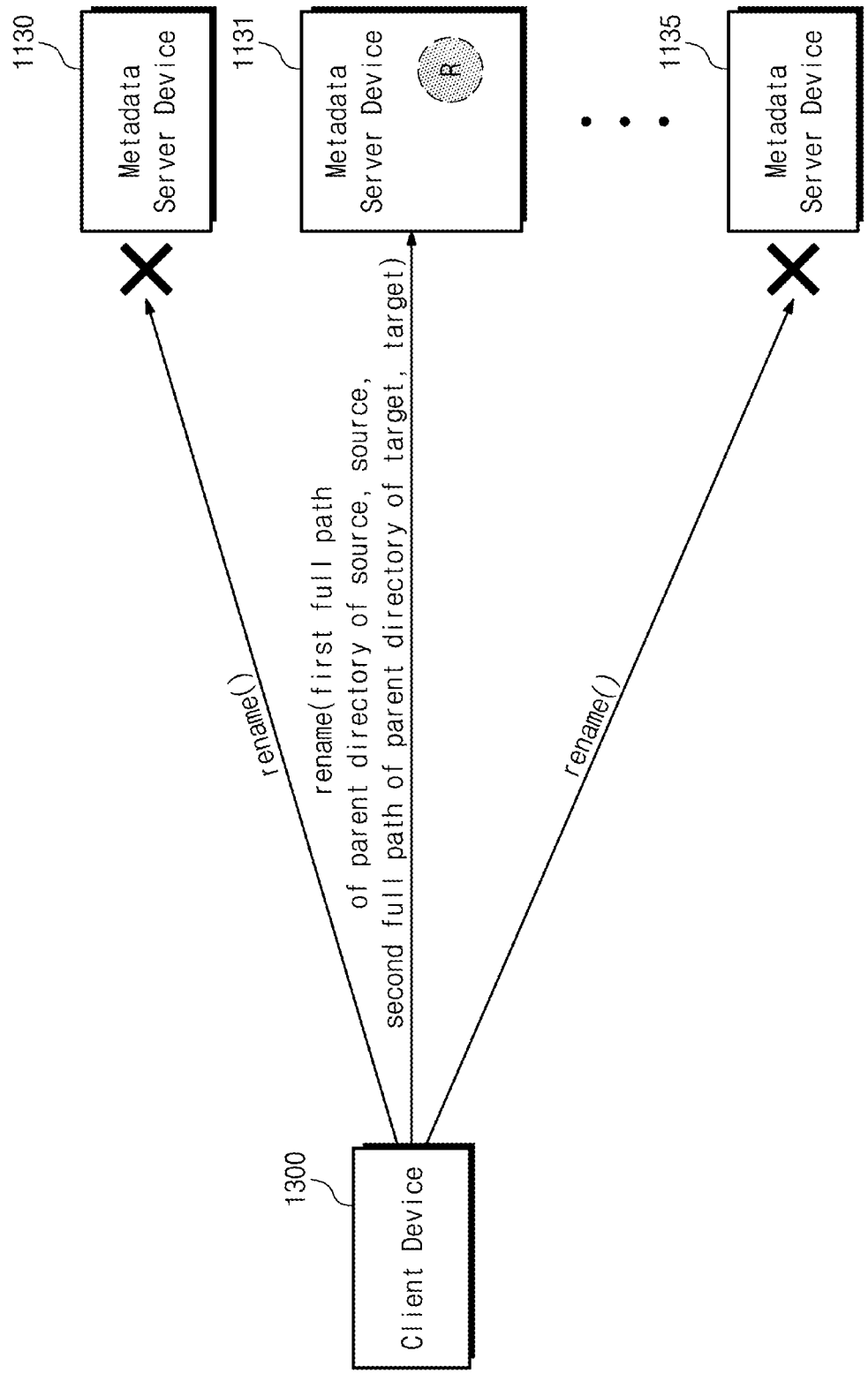
FIG. 8 is a conceptual diagram for describing an example scheme of performing a rename operation in the distributed storage server of FIG. 1.

FIG. 8 is a conceptual diagram for describing an example scheme of performing a rename operation in the distributed storage server of FIG. 1.

For example, the client device 1300 may provide a request of a rename operation to the distributed storage server 1100 of FIG. 1. As described above, the request of the rename operation may include information associated with a parent directory of a source and a parent directory of a target. In some example embodiments, the request of the rename operation may include information associated with a full path of the parent directory of the source and a full path of the parent directory of the target.

Referring to FIG. 2 together, the full path may mean a directory path from the root directory R to a specific directory. The full path may indicate all directories located on the path from the root directory R to the specific directory. For example, a full path for the directory D3 may be notated with a form of "Root/D1/D2/D3".

The full path of the parent directory of the source of the rename operation may include a directory path from the root directory to the parent directory of the source. The full path of the parent directory of the target of the rename operation may include a directory path from the root directory to the parent directory of the target. For brevity, the full path of the parent directory of the source may be referred to as a first full path, and the full path of the parent directory of the target may be referred to as a second full path.

In some example embodiments, from among the metadata server devices 1130, 1131, and 1135, a specific metadata server device may be selected to process a request of the rename operation. For example, one metadata server device 1131 may be selected to process the request of the rename operation. In some example embodiments, the metadata server device 1131 which stores metadata associated with the root directory R may be selected to process the request of the rename operation. Alternatively, the selected metadata server device 1131 may operate to store the metadata associated with the root directory R.

In some example embodiments, the selected metadata server device 1131 may exclusively process the request of the rename operation. On the other hand, remaining metadata server devices (e.g. 1130 and 1135) other than the metadata server device 1131 may not process the request of the rename operation. In some example embodiments, the distributed storage server 1100 may operate such that the request of the rename operation is provided only to the metadata server device 1131. In some example embodiments, the remaining metadata server devices (e.g. 1130 and 1135) may ignore the request of the rename operation, or may return a rejection response for the request of the rename operation.

The metadata server device 1131 may be configured to process only the request of the rename operation. Alternatively, the metadata server device 1131 may be configured to further process a request of another type of operation (e.g. read, delete, hardlink, and/or the like) which is different from the rename operation. The remaining metadata server devices (e.g. 1130 and 1135) may perform any type of operation except the rename operation.

As described above, the rename operation may accompany distributed transactions. When multiple requests of the rename operation are processed in parallel or simultaneously (or concurrently) by several metadata server devices, collision may occur between transactions (refer to FIGS. 4 to 7).

Accordingly, when the metadata server device 1131 is selected to exclusively process the request of the rename operation, it may be possible to reduce possibility where collision occurs between transactions.

Furthermore, when the request of the rename operation includes the first full path and the second full path, it may be possible to accurately determine a case in which a dangling directory occurs. Checking a dangling directory based on the full path will be described with reference to FIGS. 11 to 14.

Figure 9:
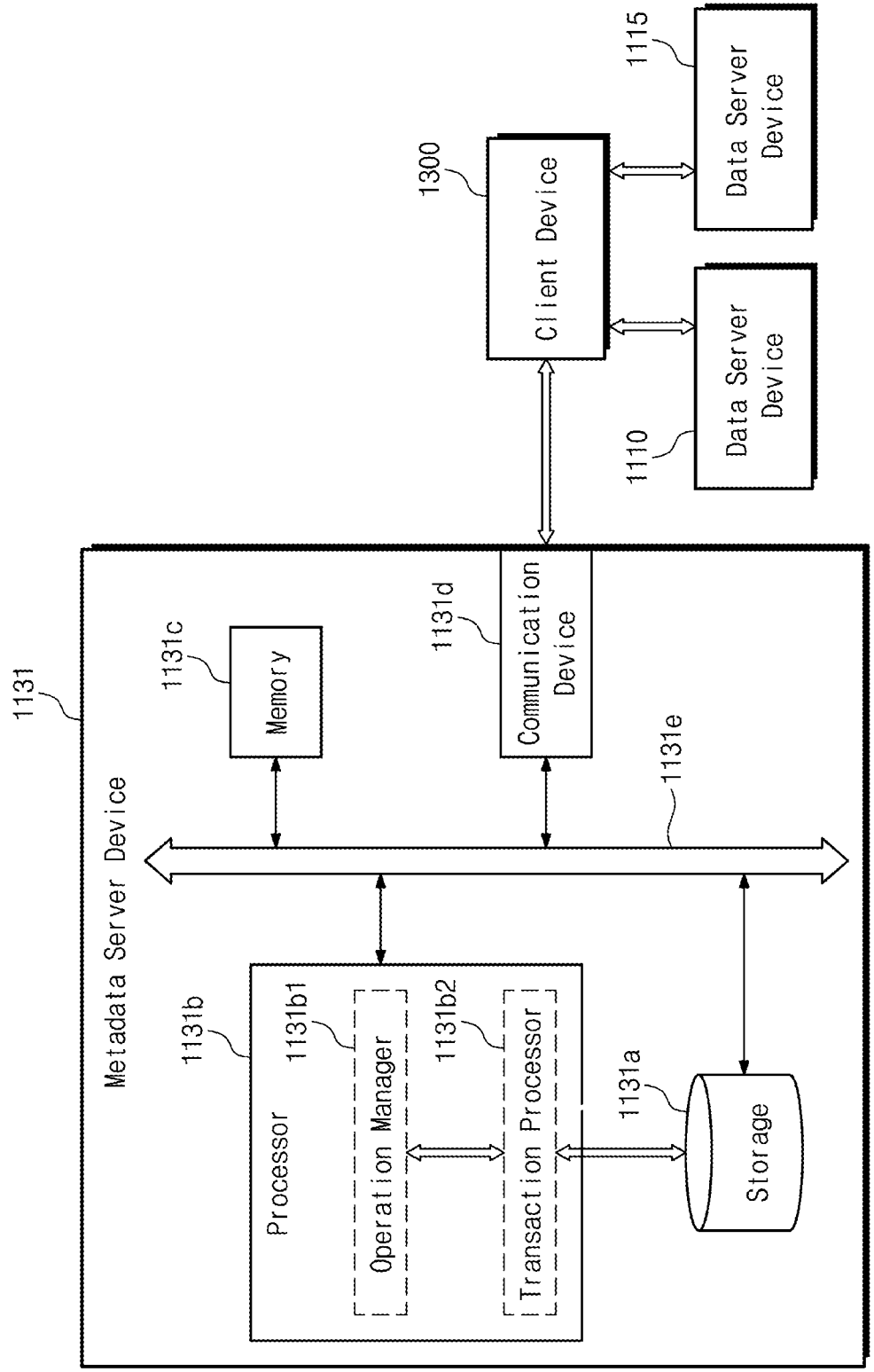
FIG. 9 is a block diagram illustrating an example configuration of the selected metadata server device of FIG. 8.

FIG. 9 is a block diagram illustrating an example configuration of the selected metadata server device of FIG. 8. In some example embodiments, the metadata server device 1131 may include a storage 1131*a*, a processor 1131*b*, a memory 1131*c*, a communication device 1131*d*, and a bus 1131*e*.

The storage 1131*a* may store some or all pieces of the metadata which is distributively stored in the distributed storage server 1100 of FIG. 1. For example, the storage 1131*a* may include a nonvolatile medium such as a hard disk drive (HDD), a solid state drive (SSD), a read-only memory (ROM), and/or the like.

The processor 1131*b* may manage overall operations of the metadata server device 1131. The processor 1131*b* may perform various arithmetic/logical operations which are required to operate the metadata server device 1131. The processor 1131*b* may control various condition factors such as scheduling, timing, sequence, and/or the like, to control operations of components of the metadata server device 1131.

The processor 1131*b* may include one or more special-purpose circuits (e.g. field programmable gate arrays (FPGA), application specific integrated circuits (ASICs), and/or the like) which are configured to perform the arithmetic/logical operations. The processor 1131*b* may include one or more processor cores. For example, the processor 1131*b* may be implemented with a general-purpose processor, a special-purpose processor, an application processor, and/or the like.

The processor 1131*b* may understand and process an instruction set of a program code. For example, the processor 1131*b* may drive an operating system by executing a program code of the operating system stored in the storage 1131*a*. For example, the processor 1131*b* may execute a program code of an application stored in the storage 1131*a* and thus may provide various services.

The processor 1131*b* may process operations performed for metadata which is stored in the storage 1131*a*. For example, the processor 1131*b* may process transactions associated with the rename operation, in response to a request of the rename operation received from the client device 1300. In some example embodiments, the processor 1131*b* may include an operation manager 1131*b*1 and a transaction processor 1131*b*2.

The operation manager 1131*b*1 may manage various operations requested by the client device 1300. For example, the operation manager 1131*b*1 may control a metadata operation required to perform the rename operation. The operation manager 1131*b*1 may request the transaction processor 1131*b*2 to process a transaction required to perform the metadata operation.

In some example embodiments, the operation manager 1131*b*1 may check whether a dangling directory occurs by performing the rename operation. The operation manager 1131*b*1 may check the dangling directory based on the request of the rename operation, and more particularly, based on information associated with the first full path and the second full path included in the request of the rename operation. Checking the dangling directory based on the full path will be described with reference to FIGS. 11 to 14. When it is determined that a dangling directory does not occur despite performing the rename operation, the operation manager 1131b1 may request the transaction processor 1131b2 to process the transaction.

The transaction processor 1131b2 may process the transaction requested by the operation manager 1131b1. For example, the transaction processor 1131b2 may suitably generate/combine a context of the transaction to perform the metadata operation. The transaction processor 1131b2 may store/read/modify/delete metadata stored in the storage 1131a, by means of the context of the transaction.

In some example embodiments, when it is determined that a dangling directory does not occur, the transaction processor 1131b2 may process transactions for the rename operation. The transactions processed by the transaction processor 1131b2 may be directed to the metadata which is distributively stored in the distributed storage server 1100. For example, the transaction processor 1131b2 may process, at least, the transactions directed to the metadata which is stored in the storage 1131a. Accordingly, the rename operation may be performed.

In some example embodiments, each of the operation manager 1131b1 and the transaction processor 1131b2 may be implemented with software. The processor 1131b may execute program codes of the operation manager 1131b1 and the transaction processor 1131b2, to provide operations of the operation manager 1131b1 and the transaction processor 1131b2. In some example embodiments, each of the operation manager 1131b1 and the transaction processor 1131b2 may be implemented with hardware. Each of the operation manager 1131b1 and the transaction processor 1131b2 may include analog/digital circuits configured to provide operations of the operation manager 1131b1 and the transaction processor 1131b2. In some example embodiments, each of the operation manager 1131b1 and the transaction processor 1131b2 may be implemented in a hybrid form of software and hardware.

FIG. 9 illustrates that the processor 1131b includes the operation manager 1131b1 and the transaction processor 1131b2. However, some or whole portions of the operation manager 1131b and/or transaction processor 1131b2 may be provided separately from the processor 1131b. FIG. 9 just illustrates one of possible example embodiments, and is not intended to limit the present disclosure.

The memory 1131c may temporally store data processed or to be processed by the processor 1131b. The memory 1131c may be provided as a buffer or a cache for the processor 1131b. For example, the memory 1131c may store data generated while an operation is processed by the processor 1131b. For example, the memory 1131c may include a memory system such as a static random access memory (SRAM), a dynamic RAM (DRAM), a synchronous RAM (SDRAM), and/or the like.

The communication device 1131d may process communication with the client device 1300. The communication device 1131d may receive requests of various operations from the client device 1300. The communication device 1131d may output a result of processing the transaction, for the client device 1300. For example, the communication device 1131d may receive a request of the rename operation, from the client device 1300. The communication device 1131d may also output a result of processing transactions associated with the rename operation, to the client device 1300.

The bus 1131e may provide a communication path between components (e.g. 1131a, 1131b, 1131c, and 1131d) of the metadata server device 1131. The bus 1131e may allow data exchange between the components of the metadata server device 1131, according to a bus format employed by the metadata server device 1131. For example, the bus format may include one or more of various protocols such as peripheral component interconnect express (PCIe), serial advanced technology attachment (SATA), universal serial bus (USB), and/or the like.

For example, the client device 1300 may request the distributed storage server 1100 to perform a rename operation for modifying the source to the target. For example, the distributed storage server 1100 may include the data server device 1110 associated with the source and the data server device 1115 associated with the target. When the processor 1131b or the operation manager 1131b1 determines that a dangling directory does not occur even if the rename operation is performed, the processor 1131b or the transaction processor 1131b2 may process transactions for the client device 1300.

The processor 1131b or the transaction processor 1131b2 may output the result of processing the transactions, based on metadata stored in the storage 1131a. The result of processing the transactions may include information associated with the source and the target. For example, the result of processing the transactions may include information of a first metadata server device associated with the source and a second metadata server device associated with the target. Accordingly, the metadata server device 1131 may output a response, as the result of processing the transactions, which is directed to the first and second metadata server devices, for the client device 1300.

The client device 1300 may access the first and second metadata server devices, based on the response which is output from the metadata server device 1131. Accordingly, the client device 1300 may access the data server devices 1110 and 1115, based on the response which is output from the metadata server device 1131. The data server devices 1110 and 1115 may be accessed by the client device 1300, based on the result of processing the transactions of the metadata server device 1131.

On the other hand, in some cases, the processor 1131b or the operation manager 1131b1 may determine that a dangling directory occurs if the rename operation is performed. Such collision may cause damage on namespace consistency, and thus the metadata server device 1131 may not allow the rename operation to be performed. Accordingly, the processor 1131b or the operation manager 1131b1 may output a response indicating a rejection of the rename operation, for the client device 1300.

FIG. 9 illustrates a configuration of the metadata server device 1131. Meanwhile, other metadata server devices included in the distributed storage server 1100 may also be configured substantially identically or similarly to the metadata server device 1131. However, other metadata server devices may not process a request of the rename operation, and may not include the operation manager 1131b1 and the transaction processor 1131b2. The data server devices 1110 and 1115, the client devices 1300 and 1305, and a master device 1170 may also be configured, similarly to the metadata server device 1131, to include components such as a storage, a processor, a memory, a communication device, a bus, and/or the like.

Figure 10:
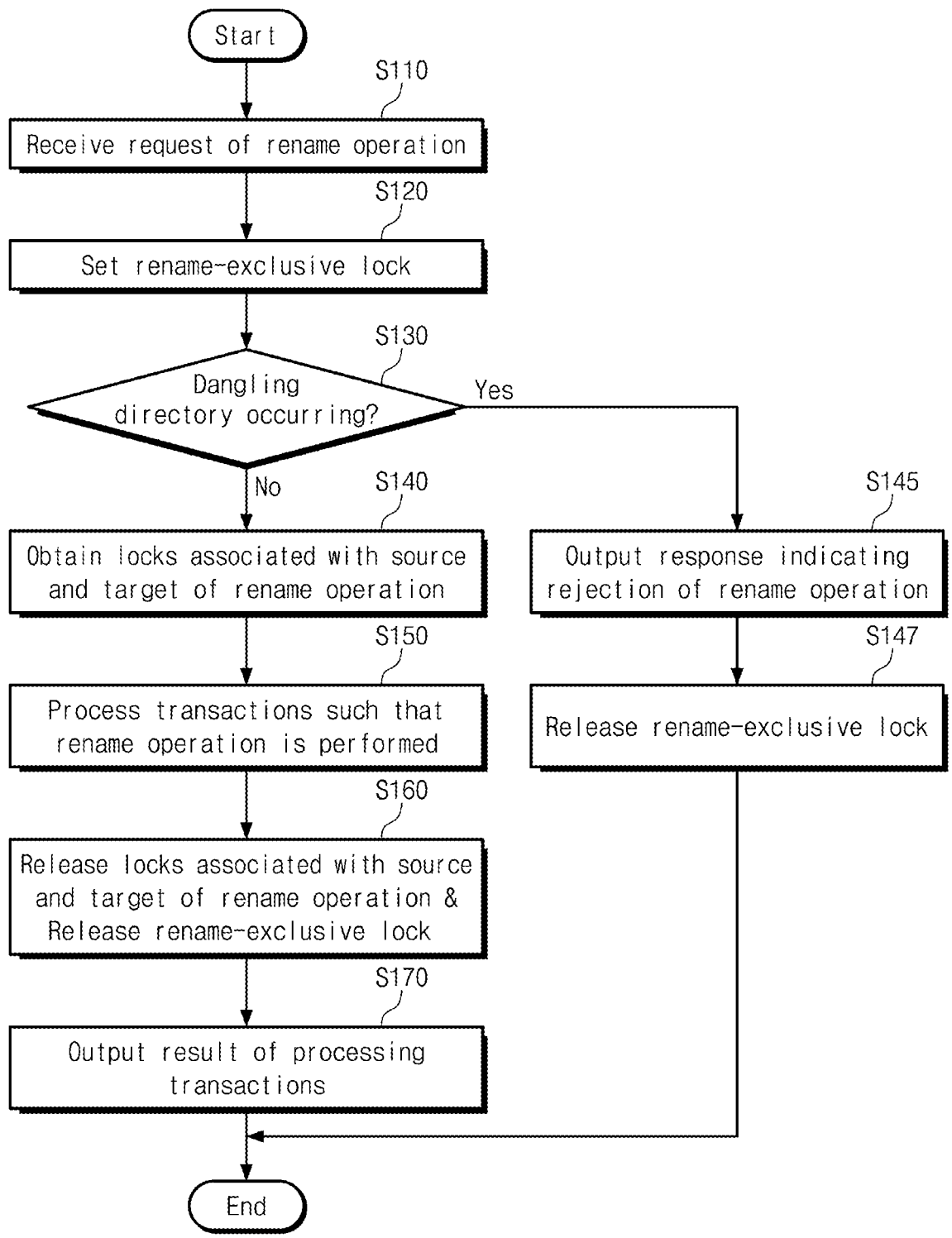
FIG. 10 is a flowchart describing an example method of operating the selected metadata server device of FIG. 8.

FIG. 10 is a flowchart describing an example method of operating the selected metadata server device of FIG. 8. To facilitate better understanding, FIG. 9 will be referred to together with FIG. 10.

In operation S110, the metadata server device 1131 may receive a request of the rename operation, through the communication device 1131*d*. In operation S120, the processor 1131*b* or the operation manager 1131*b*1 may set a rename-exclusive lock, in response to the request of operation S110.

The rename-exclusive lock may indicate that a request of a specific rename operation is currently handled. The rename-exclusive lock may not allow two or more rename operations to be performed simultaneously or concurrently. For example, when the rename-exclusive lock is already set, the processor 1131*b* or the operation manager 1131*b*1 may postpone processing other rename operations other than the rename operation of operation S110.

As described with reference to FIGS. 4 and 7, when multiple rename operations are performed together (e.g. in parallel or simultaneously or concurrently), collision such as deadlock or a dangling directory may occur. Accordingly, in some example embodiments, the metadata server device 1131 may manage the rename-exclusive lock such that only one rename operation is performed at a time. For example, the metadata server device 1131 may sequentially perform multiple rename operations, with reference to the rename-exclusive lock. Accordingly, the metadata server device 1131 may prevent a variety of collision including deadlock, a dangling directory, and/or the like.

Afterwards, in operation S130, the processor 1131*b* or the operation manager 1131*b*1 may check whether a dangling directory occurs by performing the rename operation. The processor 1131*b* or the operation manager 1131*b*1 may check the dangling directory based on information included in the request of operation S110 (e.g. information associated with the first full path and the second full path). Some example methods of checking a dangling directory will be described with reference to FIGS. 11 to 14.

When it is determined that a dangling directory does not occur, operation S140 may be performed. On the other hand, when it is determined that a dangling directory occurs, operation S145 may be performed.

In operation S145, to prevent the dangling directory from occurring, the metadata server device 1131 may output a response indicating a rejection of the rename operation. In addition, in operation S147, the processor 1131*b* or the operation manager 1131*b*1 may release the rename-exclusive lock which has previously been set in operation S120.

When it is determined that the dangling directory does not occur, the operation manager 1131*b*1 may request the transaction processor 1131*b*2 to process transactions which are required to perform a metadata operation. Accordingly, in operation S140, the processor 1131*b* or the transaction processor 1131*b*2 may obtain locks associated with the source and the target of the rename operation first. Afterwards, in operation S150, the processor 1131*b* or the transaction processor 1131*b*2 may process the transactions which are directed to the distributively stored metadata. This may allow the rename operation to be performed on the source and the target.

As described above, the lock may be related to an access authority. To prevent collision with other operation, the processor 1131*b* or the transaction processor 1131*b*2 may obtain the locks associated with the source and the target of the rename operation. An example method of obtaining the locks will be described with reference to FIG. 15.

As can be understood with reference to FIG. 10, checking whether a dangling directory occurs (i.e. operation S130) may be performed in advance before a transaction period (i.e. operation S150) for processing transactions. This may allow only transactions which do not cause a dangling directory to be processed, and thus stability and reliability of the metadata server device 1131 may be improved. Furthermore, performance and efficiency for processing a transaction may be improved, by separating a process of checking the dangling directory from processing the transaction.

In operation S160, in response to completion of processing the transactions, the processor 1131*b* or the transaction processor 1131*b*2 may release the locks associated with the source and the target of the rename operation. In addition, in response to completion of processing the transactions, the processor 1131*b* or the operation manager 1131*b*1 may release the rename-exclusive lock. In operation S170, the metadata server device 1131 may output a result of processing the transactions through the communication device 1131*d*. The output result may include information associated with the source and the target.

In some example embodiments, while the rename-exclusive lock of operation S120 is set, the metadata server device 1131 may receive a request of an additional rename operation other than the rename operation of operation S110. In this case, the metadata server device 1131 may postpone a process associated with the additional rename operation, in response to the rename-exclusive lock. Afterwards, after the rename-exclusive lock is released in operation S160, the metadata server device 1131 may perform an operation (e.g. operation S120 to operation S170 of FIG. 10) associated with the additional rename operation.

FIGS. 11 and 12 are conceptual diagrams for describing an example method of preventing a dangling directory from occurring in the selected metadata server device of FIG. 8. To facilitate better understanding, FIG. 9 will be referred to together with FIGS. 11 and 12.

The metadata server device 1131 may process a request of a rename operation. As described with reference to FIG. 8, the request of the rename operation may include information associated with the first full path and the second full path. For example, the metadata server device 1131 may receive a request Q5' of FIG. 11 based on the first full path and the second full path, instead of receiving the request Q5 described with reference to FIG. 6.

Referring to FIG. 11, the request Q5' may include the first full path, "Root/D4", of the parent directory D4 of the source directory D5, and may include the second full path, "Root/D4/D5/D6", of the patent directory D6 of the target directory D5. The processor 1131*b* or the operation manager 1131*b*1 may check whether a dangling directory occurs by performing a rename operation of the request Q5', based on information of the first full path and the second full path.

Meanwhile, referring to FIGS. 6 and 7 together, it may be understood that a dangling directory may occur when the second full path for the target includes the first full path for the source. Accordingly, in some example embodiments, the processor 1131*b* or the operation manager 1131*b*1 may check whether the second full path includes the first full path, to check a dangling directory. For example, the first full path of the request Q5' is read on the second full path of the request Q5', and thus it may be understood that the second full path includes the first full path.

For example, the processor 1131*b* or the operation manager 1131*b*1 may check whether the second full path includes the first full path, according to a procedure to be described with reference to FIG. 12. Referring to FIG. 12, checking whether the second full path includes the first full path may be performed by several steps.

In each step, the processor 1131*b* or the operation manager 1131*b*1 may select a reference directory. The reference directory may be changed downward by each one level of directory on the second full path from a root directory to a parent directory of a target. For example, in regards to the request Q5', the reference directory may be changed downward by each one level of directory from the root directory to the parent directory D6 of the target D5.

In each step, the processor 1131*b* or the operation manager 1131*b*1 may select a partial path. The partial path may correspond to a directory path from the root directory to the reference directory. For example, in the third step associated with the request Q5', the reference directory may be selected as "D5", and the partial path may be selected as "Root/D4/D5". The partial path may be understood as a directory path which is partially included in the second full path.

In each step, the processor 1131*b* or the operation manager 1131*b*1 may check whether the partial path is identical to the first full path. For example, in the first step associated with the request Q5', the partial path is different from the first full path, and thus the processor 1131*b* or the operation manager 1131*b* may proceed to a next step. In the second step associated with the request Q5', the partial path is identical to the first full path, the processor 1131*b* or the operation manager 1131*b* may determine that a dangling directory is to occur. In this case, the third and fourth steps may not be performed.

In some cases, until all steps are performed, a partial path which is identical to the first full path may not be found. This may mean that the second full path does not include the first full path. Accordingly, in this case, the processor 1131*b* or the operation manager 1131*b*1 may determine that a dangling directory does not occur.

According to the example method described with reference to FIGS. 11 and 12, the metadata server device 1131 may prevent a rename operation which causes a dangling directory. Accordingly, for example, collision such as those described with reference to FIGS. 6 and 7 may not occur, and stability and reliability may be improved.

FIGS. 13 and 14 are conceptual diagrams for describing an example method of preventing a dangling directory from occurring in the selected metadata server device of FIG. 8. To facilitate better understanding, FIG. 9 will be referred to together with FIGS. 13 and 14.

For example, the metadata server device 1131 may receive a request Q7' of FIG. 13 based on the first full path and the second full path, instead of receiving the request Q7 described with reference to FIG. 7. However, the request Q7' may be processed after processing transactions of a preceding request of a rename operation has been completed and a rename-exclusive lock of the preceding request has been released.

Referring to FIG. 13, the request Q7' may include a first full path, "Root/D1/D2", of the parent directory D2 of the source directory D3, and may include a second full path, "Root/D4/D5/D6", of the patent directory D6 of the target directory D3. The processor 1131*b* or the operation manager 1131*b*1 may check whether a dangling directory occurs by performing a rename operation of the request Q7', based on information of the first full path and the second full path.

Meanwhile, referring to FIG. 7 together, it may be understood that a dangling directory may occur when the following request Q7 is immediately processed after the preceding request Q6 has changed a namespace. In other words, the immediate request Q7 for an unchanged namespace may cause a dangling directory on a changed namespace. Accordingly, in some example embodiments, the processor 1131*b* or the operation manager 1131*b*1 may check whether a child directory of a specific directory actually exists at a lower level of the specific directory.

For example, according to a procedure to be described with reference to FIG. 14, the processor 1131*b* or the operation manager 1131*b*1 may check whether a child directory of a specific directory actually exists at a lower level of the specific directory. Referring to FIG. 14, checking whether the child directory of the specific directory actually exists at the lower level of the specific directory may be performed by several steps.

In each step, the processor 1131*b* or the operation manager 1131*b*1 may select object directories. The object directories may include a specific directory included in the second full path, and may include a child directory of the specific directory. The object directories may correspond to a pair of adjacent directories included in the second full path. For example, in the second step associated with the request Q7', the directory D4 on the second full path and the child directory D5 of the directory D4 may be selected.

In each step, the processor 1131*b* or the operation manager 1131*b*1 may check whether a specific child directory actually exists at a lower level of a specific directory, with reference to the object directories. For example, in the first step associated with the request Q7', the child directory D4 actually exists at a lower level of the root directory, and thus the processor 1131*b* or the operation manager 1131*b* may proceed to a next step.

However, the preceding request Q6 described with reference to FIG. 7 may have already moved the directory D5 to a lower level of the directory D3. Accordingly, in the second step associated with the request Q7', the directory D5 may not exist at a lower level of the directory D4. In this example, the processor 1131*b* or the operation manager 1131*b*1 may determine that a dangling directory is to occur. The third step may not be performed.

In some cases, until all steps are performed, it may be determined that child directories actually exist at lower levels of respective parent directories thereof. This may mean that namespace consistency is not damaged. Accordingly, in this case, the processor 1131*b* or the operation manager 1131*b*1 may determine that a dangling directory does not occur.

In some example embodiments, the processor 1131*b* or the operation manager 1131*b*1 may communicate with other metadata server device(s) which stores metadata associated with a specific directory and its child directory, to check whether the child directory actually exists at a lower level of the specific directory. The other metadata server device(s) which has received a request from the processor 1131*b* or the operation manager 1131*b*1 may output a response indicating whether a specific child directory actually exists, for the metadata server device 1131.

According to the example method described with reference to FIGS. 13 and 14, the metadata server device 1131 may prevent a rename operation which causes a dangling directory. Furthermore, when the rename-exclusive lock described with reference to FIG. 10 is employed to prevent multiple rename operations from being performed together (e.g., simultaneously or concurrently), the metadata server device 1131 may prevent namespace consistency from being damaged. Accordingly, for example, collision such as those described with reference to FIG. 7 may not occur, and stability and reliability may be improved.

FIG. 15 is a conceptual diagram for describing an example method of obtaining a lock for an operation parameter in the selected metadata server device of FIG. 8. To facilitate better understanding, FIG. 9 will be referred to together with FIG. 15.

For example, the metadata server device 1131 may receive a request Q3' of FIG. 15 based on the first full path and the second full path, instead of receiving the request Q3 described with reference to FIG. 5. In addition, the metadata server device 1131 may further receive a request (e.g. a request Q4 of a hardlink operation) having a different type from the rename operation. In this example, the metadata server device 1131 may obtain locks associated with the hardlink operation of the request Q4 as well as locks associated with the rename operation of the request Q3'.

In some example embodiments, locks for directories and/or files of operation parameters may be identically obtained according to a specific sequence over all the metadata server devices. The metadata server device 1131 may obtain the locks for the request Q3' according to the specific sequence, and a metadata server device which processes the request Q4 may also obtain the locks for the request Q4 according to the same specific sequence.

In some example embodiments, the specific sequence for obtaining locks may include a sequence of "parent→child". In these example embodiments, a lock for a parent level of directory may be obtained before acquiring a lock for a child level of directory.

For example, referring to FIG. 15, the rename operation of the request Q3' may accompany locks for the parent directory D1 and the child directory D2. Furthermore, the hardlink operation of the request Q4 may also accompany the locks for the parent directory D1 and the child directory D2. In this example, all the metadata server devices may obtain a lock for the parent directory D1 first, and then may obtain a lock for the child directory D2.

Meanwhile, in some cases, directories of operation parameters may not have a parent-child relationship. In some example embodiments, the specific sequence for obtaining locks may include a creation sequence of entities. In these example embodiments, a lock for a directory which is created relatively earlier may be obtained before a lock for a directory which is created relatively later is obtained. Alternatively, a lock for a directory which is created relatively later may be obtained before a lock for a directory which is created relatively earlier is obtained. For example, the creation sequence may be recognized based on "ctime" information of an inode of a specific directory.

According to the examples described with reference to FIGS. 4 and 5, when the metadata server devices obtain locks according to different sequences, deadlock may occur due to a difference between the lock sequences. However, according to the example method described with reference to FIG. 15, when all the metadata server devices obtain locks according to the same specific sequence, deadlock may not occur. Accordingly, for example, collision such as those described with reference to FIGS. 4 and 5 may not occur, and stability and reliability may be improved.

However, the above examples describe some of various possible example embodiments. The lock sequence may further include various other manners. The above-described examples are provided to facilitate better understanding, and are not intended to limit the present disclosure.

The configuration shown in each of conceptual diagrams should be understood just from a conceptual point of view. To facilitate better understanding of some example embodiments, forms, structures, sizes, and/or the like, of components illustrated in the conceptual diagrams may be exaggerated or reduced. A configuration actually implemented may have a different physical shape from that shown in each conceptual diagram. Each conceptual diagram is not intended to limit configurations and physical shapes of components.

A configuration illustrated in each of block diagrams is provided to facilitate better understanding. Each block may be implemented with smaller units of blocks according to its function. Alternatively or additionally, a plurality of blocks may be implemented in a larger unit of block according to their functions. The present disclosure is not limited to the configuration illustrated in each of the block diagrams.

In the above descriptions, the present disclosure has been described based on some example embodiments. However, the purpose and the effect intended by the present disclosure may be achieved with a different implementation from the above example embodiments including the subject matters of the present disclosure, due to the nature of the art. Therefore, it should be understood that the above example embodiments are in descriptive and illustrative views, rather than restrictive views. That is, the implementation which includes the subject matters of the present disclosure and may achieve the same purpose and effect as the present disclosure should be construed to be included within the spirits or the scope claimed by the inventive concepts of the present disclosure.

Therefore, a modified or altered implementation without departing from the scope or the spirit of the present disclosure is included in the scope claimed by the present disclosure. In addition, the scope of the present disclosure is not limited to the above example embodiments, and should be understood as covering the inventive concepts read from the following claims.

What is claimed is:

1. A distributed storage server comprising:
a plurality of data server devices configured to distributively store data and manage the distributively stored data with a structure of directories, a namespace describing the structure of directories and including a plurality of directories hierarchically connected to each other; and
a plurality of metadata server devices configured to distributively store metadata, the metadata being associated with the distributively stored data,
wherein a metadata server device selected from among the plurality of metadata server devices is configured to,
check whether a dangling directory occurs in the namespace when performing a rename operation, the checking being based on information associated with a first full path of a parent directory of a source and a second full path of a parent directory of a target, the information being included in a request of the rename operation which is received from a client device, the dangling directory indicating that a directory path in the namespace is disconnected, and
process transactions directed to the distributively stored metadata such that the rename operation is performed, when it is determined that the dangling directory does not occur, and
wherein the checking is performed before a transaction period, the transaction period being for processing the transactions,
wherein the request of the rename operation comprises information associated with the first full path of the parent directory of the source of the rename operation, and comprises information associated with the second full path of the parent directory of the target of the rename operation, wherein the second full path comprises a first directory and a second directory, the second directory being a child of the first directory, wherein the metadata server device is further configured to:

check whether the second directory actually exists at a lower level of the first directory, while checking whether the dangling directory occurs, and communicate with other metadata server devices which store metadata associated with the first and second directories, to check whether the second directory actually exists at the lower level of the first directory.

2. The distributed storage server of claim 1, wherein:
the selected metadata server device is further configured to exclusively process the request of the rename operation, and
remaining metadata server devices other than the selected metadata server device are configured not to process the request of the rename operation.

3. The distributed storage server of claim 1, wherein:
the selected metadata server device is further configured to store metadata associated with a root directory of the namespace for the distributively stored data.

4. The distributed storage server of claim 1, wherein:
the plurality of metadata server devices comprises a first metadata server device associated with the source and a second metadata server device associated with the target,
the selected metadata server device is further configured, for the client device, to output a response directed to the first and second metadata server devices as a result of processing the transactions, when it is determined that the dangling directory does not occur, and
the first and second metadata server devices are accessed by the client device based on the output response such that the rename operation is performed.

5. The distributed storage server of claim 1, wherein:
the selected metadata server device is further configured, for the client device, to output a response indicating a rejection of the rename operation, when it is determined that the dangling directory occurs.

6. A server device comprising:
a storage to store metadata, the metadata being associated with data distributively stored in a distributed storage server, which manages the distributively stored data with a structure of directories, a namespace describing the structure of directories and including a plurality of directories hierarchically connected to each other; and
a processor configured to check, in response to a request of a rename operation, whether a dangling directory occurs in the namespace when performing the rename operation, the dangling directory indicating that a directory path in the namespace is disconnected, and to process transactions directed to at least the metadata such that the rename operation is performed, when it is determined that the dangling directory does not occur, wherein the checking is performed before a transaction period, the transaction period being for processing the transactions, wherein the request of the rename operation comprises information associated with a first full path of a parent directory of a source of the rename operation, and comprises information associated with a second full path of a parent directory of a target of the rename operation, wherein the second full path comprises a first directory and a second directory, the second directory being a child of the first directory, and wherein the processor is further configured to:

check whether the second directory actually exists at a lower level of the first directory, while checking whether the dangling directory occurs, and communicate with other server devices which store metadata associated with the first and second directories, to check whether the second directory actually exists at the lower level of the first directory.

7. The server device of claim 6, wherein:
the first full path comprises a full path from a root directory to the parent directory of the source,
the second full path comprises a full path from the root directory to the parent directory of the target, and
the processor is further configured to check whether the second full path includes the first full path, to check whether the dangling directory occurs.

8. The server device of claim 7, wherein:
the processor is further configured to check whether a partial path included in the second full path is identical to the first full path, to check whether the second full path includes the first full path,
the partial path corresponds to a directory path from the root directory to a reference directory, and
the reference directory is changed downward by each one level of directory on the second full path from the root directory to the parent directory of the target.

9. The server device of claim 6, wherein:
the processor is further configured to,
set a rename-exclusive lock in response to the request of the rename operation, and
release the rename-exclusive lock in response to completion of processing the transactions.

10. The server device of claim 9, wherein:
the processor is further configured to postpone processing other rename operations other than the rename operation, in response to setting the rename-exclusive lock.

11. A method of operating a server device, the method comprising:
receiving, through a communication device of the server device, a first request of a rename operation, the rename operation being to be performed on data distributively stored in a distributed storage server, which manages the distributively stored data with a structure of directories, a namespace describing the structure of directories and including a plurality of directories hierarchically connected to each other;
setting, by a processor of the server device, a rename-exclusive lock in response to the first request;
after setting the rename-exclusive lock, checking, by the processor, whether a dangling directory occurs in the namespace when performing the rename operation, the checking being based on information included in the first request, the dangling directory indicating that a directory path in the namespace is disconnected;
obtaining, by the processor, first locks associated with a source and a target of the rename operation, when it is determined that the dangling directory does not occur;
after obtaining the first locks, processing, by the processor, transactions directed to metadata which is stored in the server device, such that the rename operation is performed for the source and the target;

receiving, through the communication device, a second request of an operation having a different type from the rename operation; and obtaining, by the processor, second locks associated with the operation having the different type.

12. The method of claim 11, wherein:

in obtaining the first and second locks, a lock for a parent level of directory is obtained before a lock for a child level of directory is obtained.

13. The method of claim 11, wherein:

in obtaining the first and second locks, a lock for a first directory is obtained before a lock for a second directory is obtained, the second directory being created later than the first directory.

14. The method of claim 11, further comprising:

receiving, through the communication device, a third request of a rename operation;

releasing, by the processor, the rename-exclusive lock in response to completion of processing the transactions; and after releasing the rename-exclusive lock, performing, by the processor, an operation associated with the third request.

15. The method of claim 11, further comprising:

releasing, by the processor, the rename-exclusive lock in response to completion of processing the transactions; and outputting, through the communication device, a result of processing the transactions.

* * * * *